Aug. 28, 1951 — F. BURGHAUSER — 2,565,947
SCREW PRESS
Filed Oct. 6, 1950 — 3 Sheets-Sheet 1

INVENTOR.
Franz Burghauser

BY
HIS ATTORNEYS

Aug. 28, 1951  F. BURGHAUSER  2,565,947
SCREW PRESS
Filed Oct. 6, 1950  3 Sheets-Sheet 2
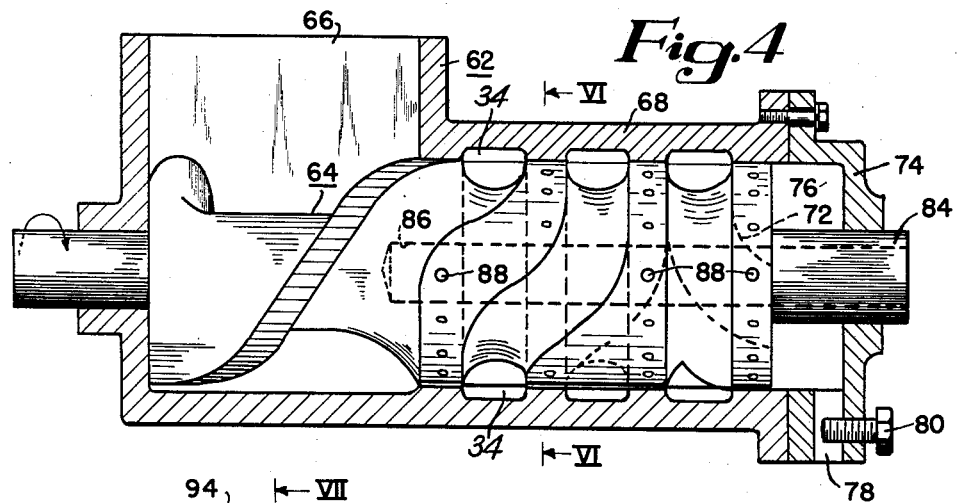
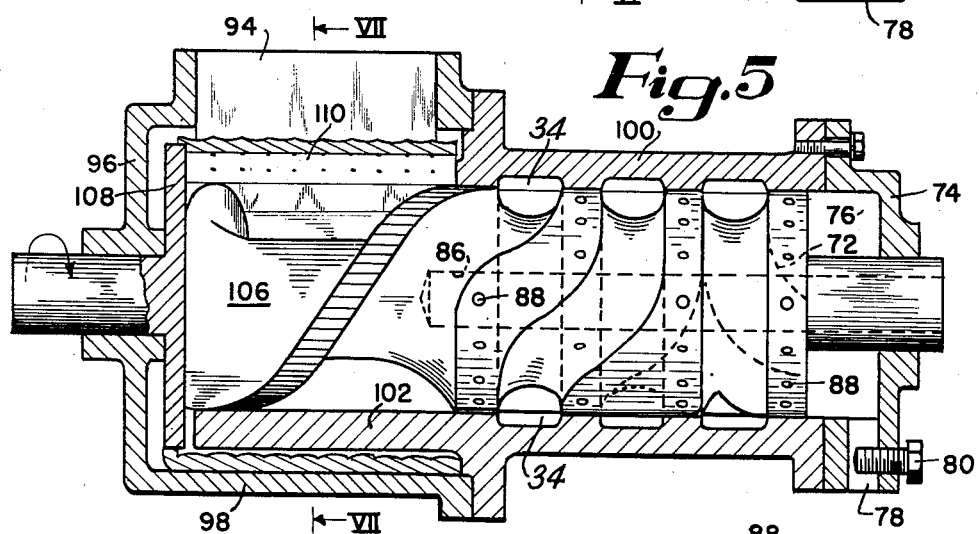
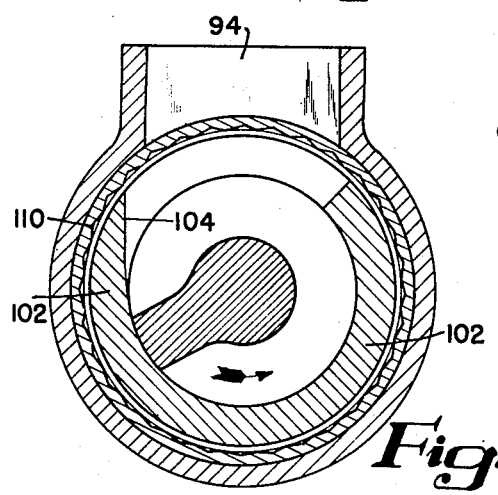
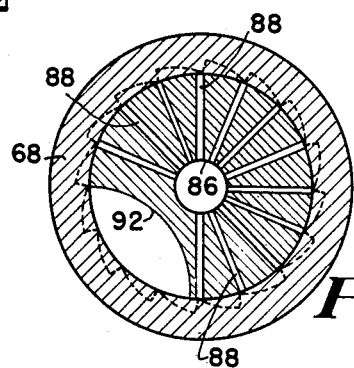
INVENTOR.
Franz Burghauser
BY
HIS ATTORNEYS Aug. 28, 1951  F. BURGHAUSER  2,565,947
SCREW PRESS Filed Oct. 6, 1950  3 Sheets-Sheet 3

INVENTOR.
Franz Burghauser
BY *Webb, Mackey & Burden*
HIS ATTORNEYS

Patented Aug. 28, 1951

2,565,947

UNITED STATES PATENT OFFICE 2,565,947

SCREW PRESS

Franz Burghauser, Bayern, Germany

Application October 6, 1950, Serial No. 188,701

3 Claims. (Cl. 100—48)

This invention relates to improvements in machines of the screw or worm type such as are used to squeeze, grind or otherwise, treat a food or other material under pressure in order to extract a liquid therefrom, or crush the material, or for any other purpose.

Conventional press machines comprise a stator or housing in which a rotor in the form of a screw or worm is rotatably carried, the housing and rotor cooperating to form a generally helical work passage through which the material moves in passing through the press. The wall of the housing at the passage is provided with material-holding grooves or tracking elements; and the rotor usually comprises a screw having a thread of helical design having a significant pitch, lead or advance at substantially all its points, but with the pitch, lead or advance decreasing in a direction along the work passage leading to its discharge. The grooves hold the material against free rotation with the screw; and the decreasing advance of the thread builds up a pressure on the material in the work passage. The screw may be provided with more than one thread, especially near the discharge end of the work passage. The efficiency of such press machines is usually comparatively low, a drawback being the tendency of material to flow back when sizeable pressures are built up.

An object of the present invention is to provide a press machine of the type described that lacks the foregoing disadvantages, but which, instead, can produce relatively higher pressures on the material passing therethrough. Accordingly, a press machine embodying my invention is much more effective and efficient for squeezing, feeding, grinding, crushing or otherwise treating materials fed therethrough as compared to prior machines of comparable size.

Another object of my invention is to provide a press machine having a work passage that extends from the feed end to the discharge end of the press, but has one or more annular stages therealong with substantially no pitch or advance.

A further object of my invention is to provide a press machine comprising a cylinder or housing and a rotor that cooperate to form the work passage, but one of these elements having a thread with one or a plurality of thread-turns, each of which is slightly less than a complete circle and has no pitch or advance, the thread-turns having joining or interconnecting thread-portions that do have a significant pitch or angle of advance. The spaces between thread-turns form channels which also have no advance and are part of the work passage. By no advance I mean having no progressing component in the axial direction of the thread so that the channels are circular in planes perpendicular to the axis. Each channel cooperates with a similar groove on the other element to form an annular treatment stage in the press.

A further object of my invention is to provide an improved press machine of the type described having a plurality of annular stages which are spaced along the axis of the press, but are interconnected by short channel portions having any desired pitch or advance.

A further object of my invention is to provide an improved press machine of the type described for treating highly compressible material, the press having a plurality of pressure stages, each successive stage being volumetrically smaller than the preceding stage to accommodate the decreased volume of the material being treated.

A further object of my invention is to provide a press machine of the type described having a worm comprising a central shaft or stem and a relatively wide thread along the stem. The stem and thread are hollow, with the latter having radial holes in its outer wall. Consequently, liquid expressed from a material in the press can flow through the radial holes and into the hollow passage in the stem. This liquid can flow axially along the stem passage to any suitable outlet. In extracting juice from potatoes, certain fruits and other food materials by means of a press, it is frequently desirable to mince the material being fed to the press worm. To this end, the feed-in end of the press can be provided with a chopper means, part of which is stationary and part of which may be associated with the worm at its intake end.

Still another object of my invention is to provide a press machine of the type described in which the thread is on an internal wall of the stationary housing or cylinder of the press.

Other features, objectives, and accomplishments of my invention, in addition to the foregoing, will be discernible from the following description of preferred forms thereof, to the specific details of which the broad aspects of the invention are obviously not limited. The description is to be taken in conjunction with the accompanying drawings, in which:

Fig. 4 is an axial sectional view of a modified press machine embodying my invention, useful for extracting or expressing juice, oil, or other liquid from the material under treatment;

Fig. 5 is an axial sectional view of another modified press machine embodying my invention, the machine having a mincing means for reducing a material to a fine form prior to entering the worm;

Figs. 6 and 7 are sectional views taken substantially on the lines VI—VI and VII—VII of Figs. 4 and 5, respectively;

Figure 1:
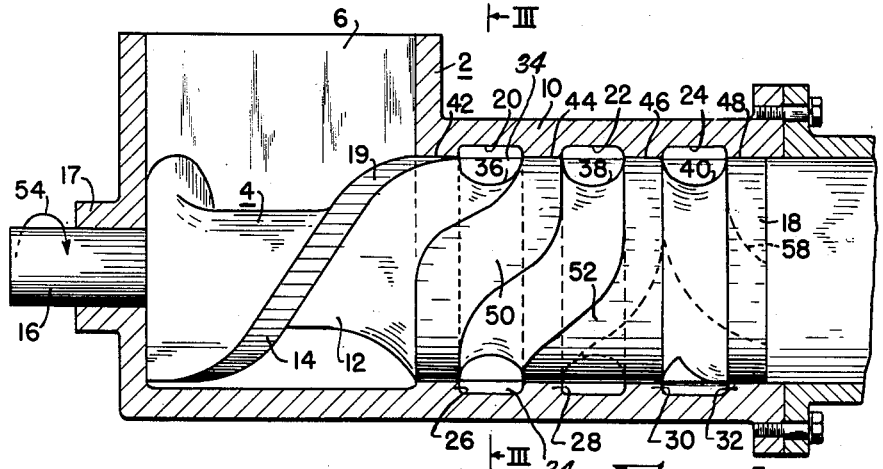
Fig. 1 is an axial sectional view of a press machine embodying the principles of my invention.
Figure 2:
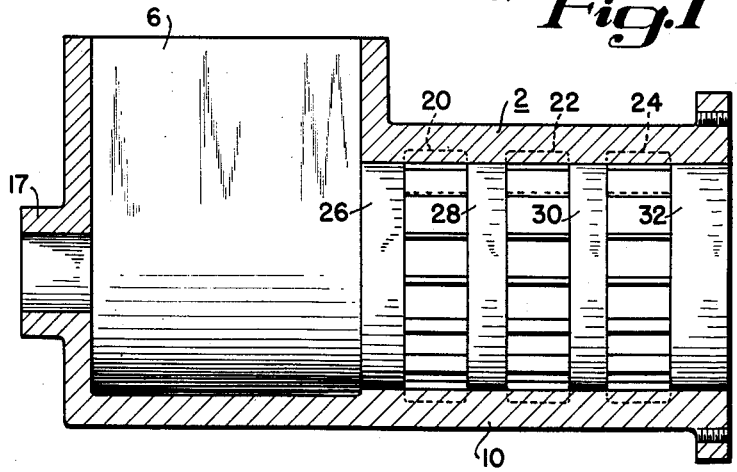
Fig. 2 is a sectional view similar to Fig. 1, but with the worm omitted, and taken substantially on the line II—II of Fig. 3.
Figure 3:
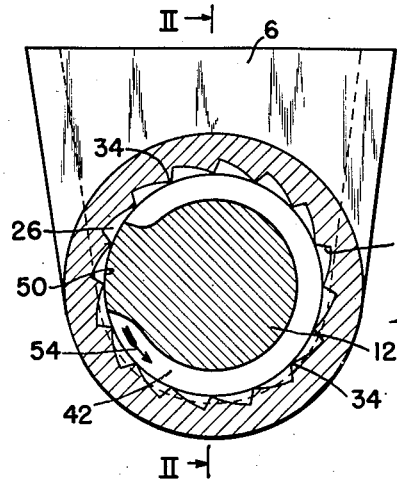
Fig. 3 is a sectional view taken substantially on the line III—III of Fig. 1.

In general, an embodiment of my invention, as shown in Figs. 1–3, comprises a press machine which is indicated by a cylinder or housing 2 and a rotor consisting of a rotatable worm 4. The housing 2 has a feed-in chamber 6 and a cylindrical wall 10 having an axis co-axial with that of the worm 4.

The worm 4 comprises an axially extending central portion or stem 12 integral with an outer thread or flight 14. The worm is rotatably mounted in the housing 2. To this end, the stem 12 has a projecting shaft portion 16 journalled in a boss 17 in a wall of the housing 2. The other end of the worm 4 comprises a round disc 18 that closely rotatably fits the adjacent portion of the inner surface of the wall 10. A turning torque, either a manual or power drive, is applied to the shaft portion 16 for turning the worm 4 in the housing 2. The thread 14 of the worm 4 has a conventional helical portion 19 in the feed-in chamber 6 that feeds the raw material to a work passage in the press. The work passage is formed by the thread 14 and the inner surface of the wall 10.

In accordance with my invention, the work passage comprises a plurality of annular stages, each of which has no continuous axial advance. The stages are spaced along the axis of the housing 2, and each stage comprises a pair of grooves or channels, one of which is provided in the housing wall of the press machine and the other of which is provided by the rotor. Adjacent stages are interconnected by a short helical or advancing channel portion provided on the thread.

With reference to Figs. 1–3, the inner surface of the housing wall 10 has a plurality of grooves, three being shown in the embodiment being described and identified by the reference numerals 20, 22 and 24. These grooves are separated from each other and other openings in the press walls by wall portions 26, 28, 30 and 32, in the form of complete bands or ridges. Each of the ridges has a smooth, circularly round inner face or surface of noticeable width. Preferably, each of the grooves 20, 22 and 24 has a tubular face that is provided with numerous small zig-zag teeth 34 around its periphery, as indicated in Fig. 3.

The portion of the thread 14 that is within the housing wall 10 comprises a plurality of spaced turn portions providing as many channels in the worm as there are grooves in the housing wall. Accordingly, the worm 4 has spaced channels 36, 38 and 40 separated by thread-turns 42, 44, 46 and 48; the thread-turn 48 corresponding, in this embodiment, to the outer circumferential portion of the end disc 18. In a sense, the thread-turns are ridges on the stem 12 of the worm.

The housing 2 carries the worm 4 so that the grooves 20, 22 and 24 in the housing are kept radially aligned with the channels 36, 38 and 40, respectively, in the worm. Accordingly, the groove 20 and the channel 36 form a first stage, the groove 22 and channel 38 a second stage, and the groove 24 and channel 40 a third stage for the work passage in the press machine. The widths of the intervening housing ridges and thread-turns should be adequate to keep the stages separated for any axial play that the worm may have in the housing. The thread and ridges can be made comparatively thick.

The material to be treated is fed to the different stages in succession by having the thread-turns, with the possible exception of the last thread-turn, less than a complete circle, that is, less than 360 angular degrees, so that each thread-turn has a circumferential open portion, and displacing the open portions of the thread-turns in an angular direction in which the worm turns during operation. Accordingly, in passing from one thread-turn to the other, the interconnecting thread portion is helical or advances axially along the worm. Referring specifically to Fig. 1, the feed-in thread portion 19 of the worm merges into the leading end of the first thread-turn 42. An interconnecting helical thread portion 50 connects the lagging end of the thread-turn 42 to the leading end of the second thread-turn 44, and a helical thread portion 52 similarly connects the thread-turns 44 and 46. As is better shown in Fig. 1 in connection with the thread portion 52, each thread portion has a width that fully spans the associated stage, so that the only communication between adjacent stages is through a single channel portion defined by open portions of the thread-turns, associated thread-turns and helical thread portions. The tips of the teeth 34 are along the circumference in which the outer edge of the associated interconnecting thread portion rotates, forming a seal therewith, as better shown in Fig. 3. By confining the communication between each pair of successive stages substantially to a single opening or channel portion, high pressures can readily be built up at the discharge end of the press machine and without significant flow-back of material.

In operation of the press machine, the worm 4 turns in the direction of the arrows 54, and the housing ridges 26, 28, 30 and 32 can be said to provide bearings for the thread-turns 42, 44, 46 and 48. Raw material is fed into the feed-in chamber 6. The helical thread portion 19 in this chamber forces the material through the interconnecting channel at the open part of the first thread-turn 42, and into the first annular stage formed by the housing groove 20 and the worm channel 36. The material then passes from each stage to the next in a similar manner, moving through the work passage in a plurality of alternating circular paths and short helical paths until it is discharged into a pressure line through any suitable discharge opening 58 which, in this embodiment, leads from the groove 24 in the housing wall 10.

The embodiment of my invention shown in

Figs. 4 and 6 is constructed along the same general lines as that of Figs. 1–3. The press machine of Figs. 4 and 6 comprises a housing 62 and a worm 64. The housing 62 has a feed-in chamber 66 and a cylindrical housing wall 68 having an inner surface provided with alternating housing grooves and ridges, the grooves having teeth, such as 34 of Fig. 3, and the last groove having a discharge opening 72.

The housing further comprises an end closure 74 at the discharge end having a chamber 76 into which the discharge opening 72 opens. The end closure 74 has an outlet 78 controlled by a pressure-regulating valve 80 in the form of an adjustable screw.

The worm 64 has a stem with a shaft portion 84 at its end which is journalled in the end closure 74. This shaft portion 84 and the portion of the stem which parallels the housing wall 68 are hollow so as to provide an axial liquid-outlet passage 86 for juice or oil extracted from the material fed to the press. The extracted liquid reaches this passage 86 through a plurality of radial openings or holes 88 in each of the thread-turns of the worm, the holes extending from the passage 86 to the periphery of the thread-turns.

Liquid squeezed from the material flows into the clearance spaces between the thread-turns and housing ridges to the holes 88. This liquid flows inwardly through the holes and into the axial passage 86. The remaining solid substance of the material moves through the work passage in the press, reaching the chamber 76 and passing out of the press through the pressure-regulating valve 80.

Attention is called to Fig. 6 as more clearly showing a circumferential opening 92 in a thread-turn, the open arc subtending approximately 80 angular degrees so that the thread-turn embraces more than three quadrants.

Liquid can be extracted from some materials, such as, for example, potatoes, carrots, beets and some fruits, more efficiently if the material is first cut up or otherwise minced before reaching the treatment stages of the press. In accordance with this aspect of my invention, a means for accomplishing such mincing is added to the feed-in chamber of the press. This means comprises two cooperating elements, the first of which is fixed to the housing and the second to the rotor or worm. Figs. 5 and 7 illustrate a modification of this kind, adapted to a press of the type shown in Figs. 4 and 6.

The press machine of Figs. 5 and 7 comprises a feed-in chamber 94 comprising an offset wall 96, and a deepened bottom wall 98. The press machine also comprises a hollow cylindrical housing wall 100 fitted to the chamber 94 and having a wall portion 102 that extends into the chamber. The wall portion 102 is open at the top, in line with the feed-in opening of the chamber 94; and the leading face 104 of the wall portion 102 is beveled to a fine edge.

The press machine also comprises a worm 106 having an end plate 108 fixed thereto which carries a perforated tubular member 110 that passes around the outside of the fixed wall portion 102. The tubular member 110 is in the form of a shredder or cutter having a plurality of small raised cutting portions at its numerous openings, such as is found in grating or shredding boards known in the art. As the shredder or cutter 110 rotates with the worm, it minces the raw material fed to the chamber 94, the cut up material passing through the numerous openings in the cutter 110. The fine edge of the face 104 on the wall portion 102 scrapes or otherwise removes the minced material from the inside surface of the cutter 110 as the latter relatively rotates past the edge. The feed-in thread portion of the worm receives the cut up or mashed material and drives it forwardly for pressure treatment within the housing 100 of the press.

It is also possible to pass the material from one stage to the next via interconnecting channel portions in the stationary housing wall rather than in the rotating worm, as described in connection with the prior embodiments. For such construction, the outside of the worm has the equivalent of the circular grooves such as 20, 22 and 24 of Fig. 1; and the inside of the housing is provided with an internal thread that has spaced thread-turns having no pitch or lead, the thread-turns being interconnected by shorter thread portions that do. The press machine shown in Figs. 8, 9 and 10 includes this and other modifications.

Figure 8:
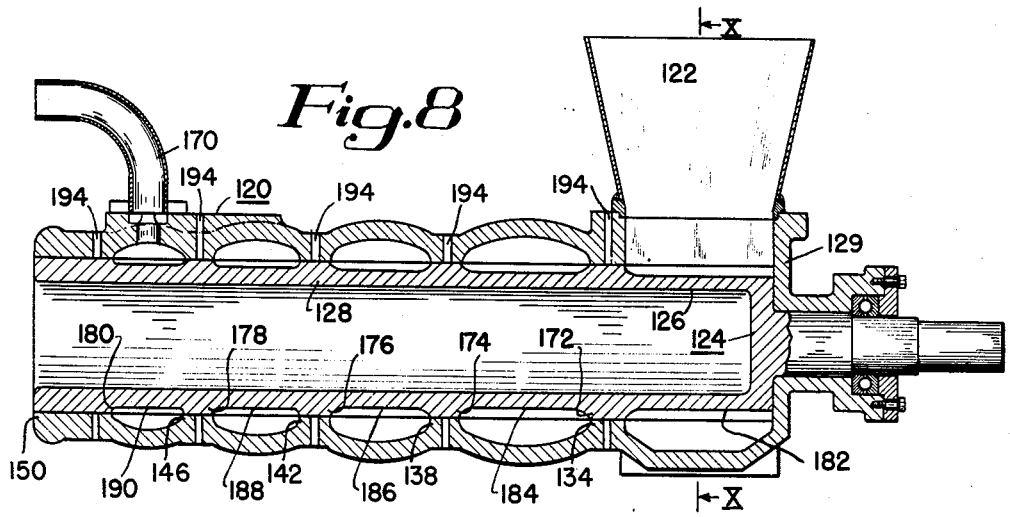
Fig. 8 is an axial sectional view of still another modified press machine embodying my invention, the machine having the arrangement of the grooves and channels on the housing and rotor reversed as compared to the arrangement of the grooves and channels of the embodiments shown in Figs. 1–7.
Figure 9:
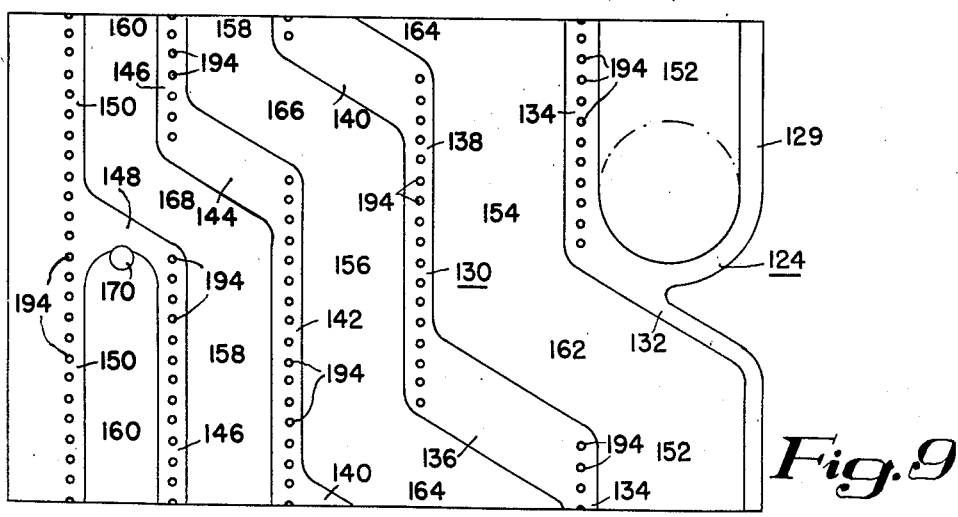
Fig. 9 is a planar development of the inner wall surface of the housing of Fig. 8 for illustrating the channel construction on the housing.
Figure 10:
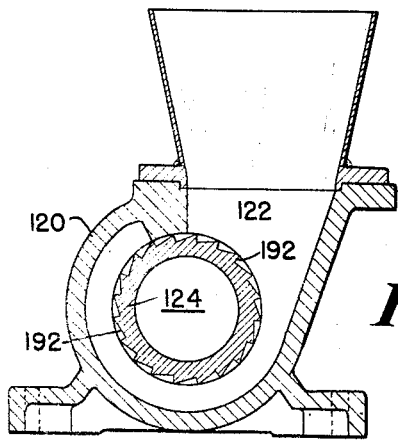
Fig. 10 is a sectional view taken substantially on the line X—X of Fig. 8.

The press machine of Figs. 8–10 comprises a stationary housing comprising a hollow elongated housing wall 120 having a feed-in chamber 122. The machine also comprises a rotor 124 rotatably carried in the housing and comprising a feeder portion 126 that rotates in the feed-in chamber 122 and a material-holding portion 128 that rotates in the housing wall 120.

The press housing has an end wall 129 in which an end of the rotor 124 is journalled. An internal thread 130 in the housing may be said to begin at the peripheral portion of this wall 129 and to extend along the inside of the housing wall 120 to the discharge end thereof. As will be apparent from Fig. 9, the thread 130 starts with a short axially advancing thread portion 132. The thread then makes a nonadvancing thread-turn 134 which is slightly less than a complete circle, thereby providing a circumferential opening in the thread-turn. The thread then continues with a short advancing thread portion 136, a less than 360 degree nonadvancing thread-turn 138, a short advancing thread portion 140, a less than 360 degree nonadvancing thread-turn 142, a short advancing thread portion 144, a less than 360 degree thread-turn 146, a short advancing thread portion 148, and so on, depending on the number of stages in the press, until the thread makes a complete circular turn 150 at the end of the housing wall 120. Accordingly, the inside of the housing has a plurality of spaced nonadvancing channels 152, 154, 156, 158 and 160 interconnected by short advancing channel portions 162, 164, 166 and 168.

It is to be noted that in this particular embodiment, the successive axially sloped thread portions 132, 136, 140, 144 and 148 are progressively shorter in a direction from the feed end of the machine to the discharge end. The various nonadvancing channels are also progressively smaller in width in the same direction so as to accommodate the progressively decreased mass of a compressible material feeding through the press machine. It is also to be noted that the circumferential openings in the nonadvancing thread-turns are also progressively smaller in accordance with the size of the channels so that the interconnecting channel portions are of correspondingly less width. For further accommodating the lesser volume of the material as it is progressively compressed or treated, the channels can also be made of decreasing heights in the axial direction of flow of the material, as clearly shown in Fig. 8. The compressed material leaves the machine through a discharge 170 at the lagging end of the last channel 160.

The rotor 124 is provided with a plurality of completely circular ridges 172, 174, 176, 178 and 180 spaced along the outside of the rotor so as to be directly radially opposite the thread-turns 134, 138, 142, 146 and 150, respectively, of the internal thread 130 of the press housing. The spaced rotor ridges separate completely annular grooves 182, 184, 186, 188 and 190 on the outside of the rotor. Each of the last four of these grooves corresponds in width to that of the housing channel which it faces and forms therewith an annular stage of the press, in the same manner as described in connection with Figs. 1-7. The outer periphery of each of the grooves is formed with saw-like teeth, such as indicated by the reference numeral 192 in Fig. 10, which correspond to the teeth 34 of the previously described embodiments. The teeth 192 help to advance the material through the work passage of the press.

For liquid extraction, each of the thread-turns in the housing wall 120 is provided with a multiplicity of radially outwardly extending holes 194.

The work passage formed by the cooperating stationary housing element and the rotor element of Figs. 8-10 is continuous from the feed end of the press to the discharge end of the press, and can be said to wind around the axis of the rotor element. As with the other embodiments, the work passage comprises a plurality of axially spaced annular stages or passage portions which have no axial advance or lead, the stages being generally circular in planes perpendicular to the axis of the rotor. The various stages are interconnected by slanting or helical channel portions or passage portions that have an axial advance, and the material under treatment is forced from one stage to the next along one of these passage portions. The saw-like teeth in the various stages help to keep the material in the stages moving in the proper direction in the work passage, and form a barrier or seal for confining communication between adjacent stages to the axially slanting passage portions. It is also to be noted that in the embodiment shown in Figs. 8-10, the volume of the respective stages decreases in the direction in which the material flows through the press. A similar expedient can obviously be applied to prior embodiments.

While I have described certain presently preferred embodiments of my invention it is to be understood that it may be otherwise embodied within the scope of the appended claims.

I claim:

1. A worm-type press of a type described comprising a worm thread comprising an advancing feed-in thread portion followed by a plurality of alternating non-advancing thread-turns and advancing thread portions joining said thread-turns providing circumferential openings in said thread-turns, a cylindrical member surrounding said worm thread and comprising a plurality of spaced circular ridges forming grooves therebetween of substantially the width of the non-advancing thread-turns and radially in line with said non-advancing thread-turns, and teeth between said ridges, said member and worm thread being relatively rotatable.

2. A worm-type press of a type described comprising a rotor member and a cylindrical member surrounding said rotor, one of said members having thereon a worm thread comprising an advancing feed-in thread portion followed by a plurality of alternating non-advancing thread-turns and advancing thread portions joining said thread-turns, providing circumferential openings in said thread-turns, the other of said members having thereon a plurality of spaced circular ridges forming grooves therebetween of substantially the width of said non-advancing thread-turns and being radially in line with said non-advancing thread-turns, and teeth between said ridges, said members being relatively rotatable.

3. A press machine as defined in claim 2 characterized by said thread being an internal thread on said cylindrical member, and said ridges being on the outside of said rotor member.

FRANZ BURGHAUSER.

REFERENCES CITED

The following references are of record in the file of this patent:

UNITED STATES PATENTS

| Number | Name | Date |
|---|---|---|
| Re. 21,449 | McNitt | May 14, 1940 |
| 625,394 | Hook | May 23, 1899 |
| 741,898 | Fahrenholz | Oct. 20, 1903 |
| 797,374 | Roberts | Aug. 15, 1905 |
| 842,236 | Neukirchen | Jan. 29, 1907 |
| 938,766 | Hubert | Nov. 2, 1909 |
| 1,069,404 | Fiddyment | Aug. 5, 1913 |
| 1,219,279 | Fiddyment | Mar. 13, 1917 |
| 1,338,120 | Brundage | Apr. 27, 1920 |
| 1,514,279 | Fiddyment | Nov. 4, 1924 |
| 1,762,368 | Vandergrift | June 10, 1930 |
| 1,769,658 | Veenhuyzen | July 1, 1930 |
| 2,149,736 | Hiller et al. | Mar. 7, 1939 |
| 2,319,859 | Hale | May 25, 1943 |
| 2,496,625 | Henning | Feb. 7, 1950 |
| 2,510,420 | Ross | June 6, 1950 |

FOREIGN PATENTS

| Number | Country | Date |
|---|---|---|
| 104,151 | Switzerland | Apr. 1, 1924 |
| 6,436 | Netherlands | Dec. 15, 1921 |
| 443,481 | Great Britain | Feb. 28, 1936 |
| 452,161 | Great Britain | Aug. 18, 1936 |